Figure 3:
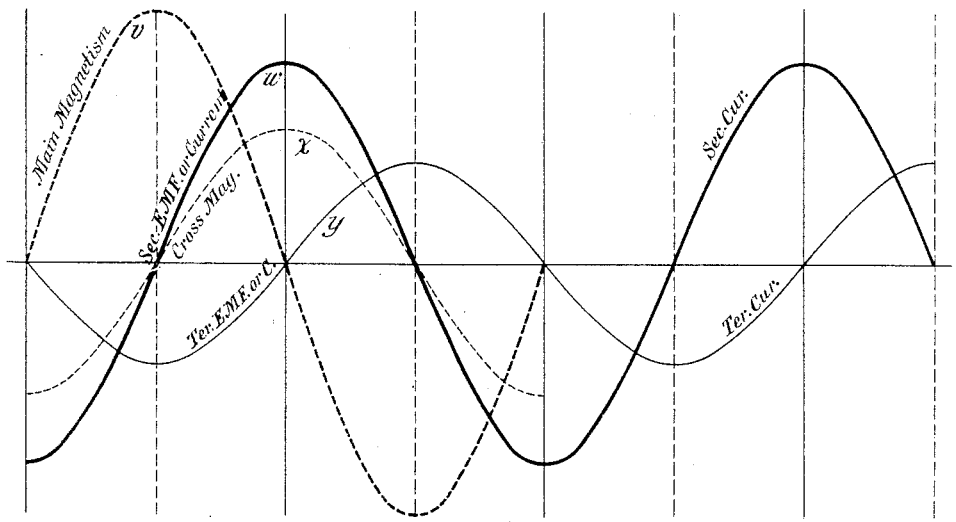

(No Model.) 6 Sheets—Sheet 1.

F. S. HUNTING.
TRANSMISSION OF POWER BY ALTERNATING CURRENTS.

No. 541,615. Patented June 25, 1895.

FIG. 1.

WITNESSES:
C. E. Ashley
Fred White

INVENTOR:
Fred S. Hunting;
By his Attorneys,
Arthur C. Fraser & Co.

(No Model.) 6 Sheets—Sheet 2.

F. S. HUNTING.
TRANSMISSION OF POWER BY ALTERNATING CURRENTS.

No. 541,615. Patented June 25, 1895.

WITNESSES:
C. E. Ashley
Fred White

INVENTOR:
Fred S. Hunting,
By his Attorneys,
Arthur C. Fraser & Co.

(No Model.) 6 Sheets—Sheet 3.

F. S. HUNTING.
TRANSMISSION OF POWER BY ALTERNATING CURRENTS.

No. 541,615. Patented June 25, 1895.

(No Model.) 6 Sheets—Sheet 4.

F. S. HUNTING.
TRANSMISSION OF POWER BY ALTERNATING CURRENTS.

No. 541,615. Patented June 25, 1895.

WITNESSES:
C. E. Ashley
Fred White

INVENTOR:
Fred S. Hunting,
By his Attorneys,
Arthur C. Fraser & Co (No Model.) 6 Sheets—Sheet 5.
F. S. HUNTING.
TRANSMISSION OF POWER BY ALTERNATING CURRENTS.

No. 541,615. Patented June 25, 1895.

WITNESSES:
C. E. Ashley
Fred White

INVENTOR:
Fred S. Hunting,
By his Attorneys,
Arthur E. Draper & Co.

(No Model.) 6 Sheets—Sheet 6.
F. S. HUNTING.
TRANSMISSION OF POWER BY ALTERNATING CURRENTS.

No. 541,615. Patented June 25, 1895.

WITNESSES: INVENTOR:
C. E. Ashley Fred S. Hunting,
Fred White By his Attorneys,
Arthur E. Fraser & Co.

UNITED STATES PATENT OFFICE.

FRED S. HUNTING, OF FORT WAYNE, INDIANA.

TRANSMISSION OF POWER BY ALTERNATING CURRENTS.

SPECIFICATION forming part of Letters Patent No. 541,615, dated June 25, 1895.

Application filed January 19, 1895. Serial No. 535,444. (No model.)

*To all whom it may concern:*

Be it known that I, FRED S. HUNTING, a citizen of the United States, residing at Fort Wayne, in the county of Allen and State of Indiana, have invented certain new and useful Improvements in the Transmission of Power by Alternating Currents, of which the following is a specification.

My invention relates to systems of transmission of power by the employment of simple or single phase alternating currents. It is well understood that in the driving of a motor by such currents, the magnetic field of the motor is oscillatory as distinguished from a rotating field, and hence the motor is not self-starting under a load; also that when once started such a motor will revolve equally well in either direction. In order to operate a motor by alternating currents to render it self-starting and give it a torque sufficient to enable it to start under full load, it has been necessary to resort to poliphase currents, usually either di-phased or tri-phased, whereby a rotating field is generated. Such currents, however, involve the disadvantage of requiring circuits with three wires instead of two.

My invention provides a means whereby ordinary alternating motors having closed circuit armatures can be operated in the same manner as by di-phased currents from a circuit supplied with simple alternating currents, or in other words my invention provides a means for generating di-phased currents at the point to which the power is electrically transmitted, whereas only simple or mono-phased currents are produced at the point where the energy is generated. My invention thus enables simple alternating motors to be operated through transformers in connection with any ordinary alternating current circuit designed for operating electric lights through suitable transformers.

To this end my invention provides an improved transformer constructed to transform a single phase alternating current into currents of two phases which differ theoretically by ninety degrees, and practically by a sufficient approximation thereto to generate a revolving field.

Figure 2:
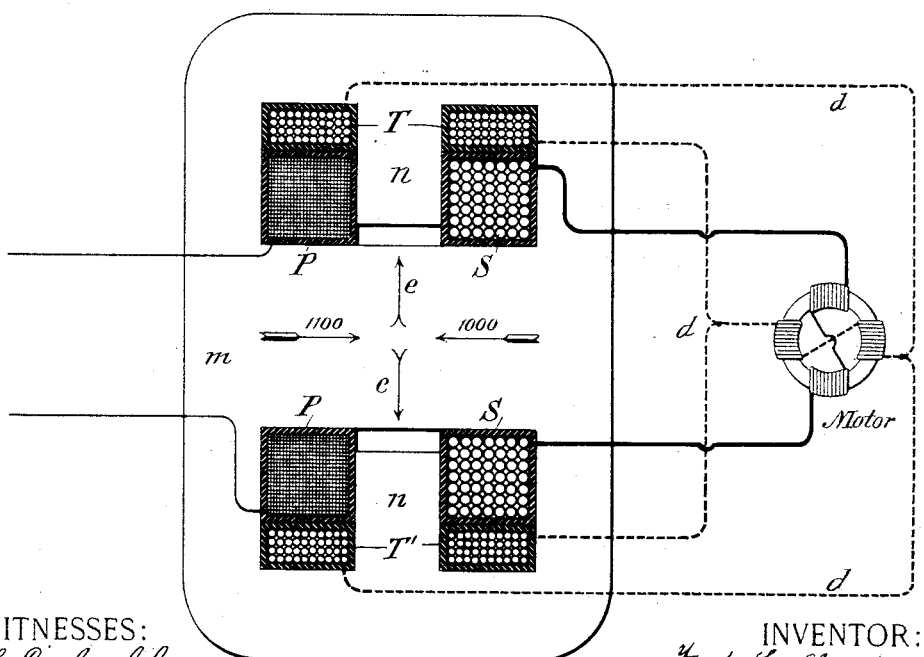
Figure 4:
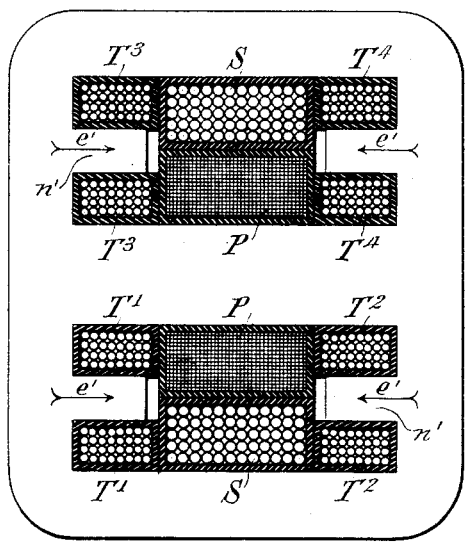
Figure 5:
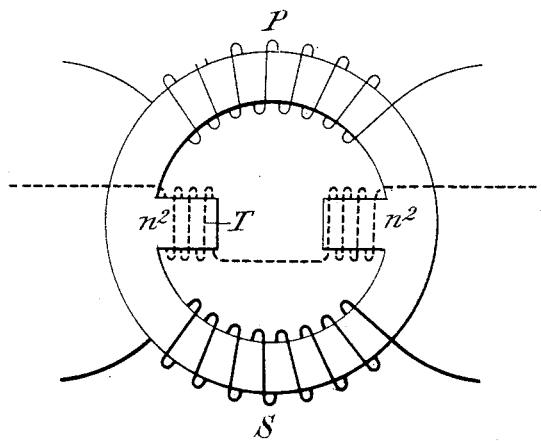

Figure 1 of the accompanying drawings is a circuit diagram illustrating the feeding of a motor and of lamps from the same single-phase alternating dynamo according to my invention. Fig. 2 is a plan of my improved transformer in its preferred form and the electrical connections with the motor. Fig. 3 is a diagram illustrating the oscillations of magnetism and of electromotive force or current involved in the operation of my transformer. Fig. 4 is a plan illustrating a modified construction of transformer. Fig. 5 is a diagrammatic illustration of a still further modification. Figs. 6 to 10 are diagrams showing modified circuit arrangements.

Referring first to Fig. 1, let G designate the dynamo or generator generating single phase alternations of electro motive force and discharging them upon a primary circuit $a\ a$. From this circuit branches are taken off to transformers connected in derivation in the usual manner. One of these transformers, B, is shown as of usual construction feeding a secondary circuit $b\ b$ wherein incandescent lamps are introduced in multiple in the usual manner. The other transformer, C, which is shown in this figure connected to the primary circuit in like manner, is employed for feeding an electro-motor M. This motor may be of any construction wherein the armature has a short-circuited winding such as the so-called squirrel-cage armatures, and in which the field-magnet is wound with coils connected in two circuits after the manner employed in the transmission of power by di-phased currents. These coils are connected in two secondary or induced circuits $c$ and $d$ leading from the transformer. For clearness, I will call $c$ the secondary circuit, and $d$ the tertiary circuit.

The peculiar construction of the transformer will be described with reference to Fig. 2. The magnetic core $m$ is laminated or built up of separate laminæ of soft iron punchings in the usual manner, any suitable subdivision of the punchings for assembling the parts being resorted to, the core being formed with preferably two openings or slots in which the primary and secondary coils may be wound. So far as the core and the primary and secondary coils are concerned, this transformer does not differ necessarily from the transformers now commonly constructed for converting high tension primary into low tension secondary currents, except that the primary and secondary coils instead of being wound the one over the other as is usually done, are wound in opposite ends of the slots or openings. Thus in Fig. 2 the primary coil is wound in the spaces P and the secondary coil is wound in the spaces S, each filling these spaces from the end of the slot to nearly the middle thereof. By reason of this arrangement consequent magnetic poles are formed which are strongest in the positions denoted by the arrows $e\ e$, that is to say, between the coils P and S, their strength gradually diminishing toward each end of the slot. The formation of these consequent poles is due to the opposition of the magnetization induced by the primary current, and the counter magnetization induced by the secondary current. For example, if the primary coil has eleven hundred ampère turns, it tends to throw a proportionate number of lines of magnetic force through the core in the direction of the arrow 1100, while if the secondary coil has for example one thousand ampère turns, it tends to project a corresponding number of lines of force through the core in the contrary direction as denoted by the arrow 1000, and these opposing forces result in the diversion of lines of force in the direction of the arrows $e\ e$ at the consequent poles, whereby lines are projected across the gaps or slots in the form of magnetic leakage, the extent of which will be determined by the particular proportions given to the transformer. These lines of magnetic leakage occur in oscillations of like frequency to that of the primary and secondary currents, and are capable of generating alternating currents in any coil which may be arranged to inclose them. For utilizing this leakage magnetism or cross field which extends transversely of the slots, I wind coils in such positions as to inclose and catch the lines of this cross field. To accomplish this with the construction shown in Fig. 2, I wind a coil in the spaces T T and another coil in the spaces T′ T′, these coils being in planes perpendicular to the planes of the primary and secondary coils. These coils T and T′ I will for clearness designate "tertiary" coils. They are connected in the tertiary circuit $d\ d$, either in series as shown in Fig. 1, or in multiple as shown in Fig. 2, as may in any case be found preferable. For reducing somewhat the magnetic resistance of the path of the cross magnetic field, and to gather in the lines as close as possible, I prefer to provide the core with lugs $n\ n$ projecting into the coils T T′, whereby as many lines as possible are directed through the inner convolutions of the coils.

The electro-motive force induced in these tertiary coils, and hence also the tertiary current, differs in phase from that in the secondary coil S by very nearly ninety degrees, or one quarter of a period. Hence by passing these tertiary and secondary currents into the field winding of the motor, the effect upon the motor is the same as though it were fed with di-phased alternating currents, that is to say, a revolving field is generated and the motor becomes self-starting, and has a torque sufficient to enable it to start under load.

The principle of operation of my invention will be made apparent from the diagram Fig. 3. The line $v$ designates the magnetic oscillations in the core of the transformer induced from the primary circuit (or which might be due to some other source). To avoid complicating the diagram, I have omitted any designation of the primary current. Inasmuch as the greatest electro-motive force is generated when the rate of change in the number of magnetic lines in the coil is greatest, it is evident that the electro-motive force generated in the secondary will vary by ninety degrees from these oscillations of magnetism, this being denoted by the line $w$. Assuming that the current generated by this secondary electro-motive force is working against a non-inductive load (which is approximately true in practice) then the phase of the secondary current will coincide with the phase of the secondary electro-motive force as denoted by the same line $w$. (In the operation of such a motor as is contemplated, the lag of the current may by proper proportioning be made so slight that for the purpose of this explanation it may be ignored.) Hence the secondary current coincides in phase or approximately so with the primary current, which is not shown in the diagram, the two currents being nearly equal and opposite. As the magnetic leakage or cross magnetism depends upon the mutually opposing magnetizing action of the primary and secondary currents, being greatest when they are greatest, and least when they are least, it is necessarily in step with them, its phase being as denoted by the curve $x$ in Fig. 3. The electro-motive force generated by this cross magnetism in the tertiary coils, varying therefrom in phase by ninety degrees, is denoted by the line $y$. Assuming that the load on the tertiary circuit is non-inductive (which by suitable proportioning may be made approximately true in practice), then the same line will designate the tertiary current, which as is best seen at the right of Fig. 3, varies by ninety degrees from the secondary current. I thus obtain di-phased currents having a difference of phase amounting theoretically to ninety degrees, and practically to somewhat less than ninety degrees. In practice there is a slight departure from the theoretical conditions, due to both the secondary current and the tertiary current working on a more or less inductive circuit, whereby they are forced to some extent out of step with their electro-motive forces, a condition which will vary according to the design of the transformer and motor, and will also vary from time to time according to variations in the load. There is also a slight magnetic disturbance due to reaction between the cross magnetism and the main magnetism. These disturbing elements appear to slightly divert from ninety degrees the difference in phase between the secondary and tertiary currents, reducing the difference in some instances to considerably below ninety degrees.

Any proportions giving a phase difference sufficient for generating a rotary field in the motor will be within my invention.

The consequent or cross field is not constant, but varies with any given proportions of transformer as the load on the secondary varies, being dependent on the number of opposed ampère turns in the primary and secondary coils. The voltage in the tertiary coils will therefore increase as the current in the secondary coil increases; and as this secondary current increases its voltage will decrease, as in any transformer wherein the primary and secondary coils are wound so as to induce consequent poles. It results that the tertiary current is greatest when the secondary current is greatest, or in other words, when there is the greatest load. Hence the motor becomes self-compensating, being driven by diphased currents in starting or whenever running under a heavy load, but as the load is diminished the tertiary current falls off, until when running under a very light load the tertiary currents have so nearly ceased that the motor becomes practically a single phase motor.

The particular construction or arrangement of parts in the transformer whereby the stated result is attained may be greatly varied so long as the principles indicated as essential to my invention are followed. As examples of modifications of which my invention is susceptible, I will refer to Figs. 4 and 5 of the drawings.

Fig. 4 shows a construction in which the primary and secondary coils are wound one over the other, so that the consequent poles generated by the opposed magnetic forces induce consequent poles in the positions indicated by the arrows $e'$ $e'$, and in these positions the transformer core is formed with lugs $n'$ to better concentrate the lines of force. Around these lugs, of which there are four, are wound respectively tertiary coils $T'$ $T^2$ $T^3$ $T^4$. These coils may be coupled in series, multiple or otherwise, as found most desirable in any particular case. This modification thus illustrates that it is not strictly essential to the formation of consequent poles upon which my invention depends, that the primary and secondary coils should be wound at opposite ends of the core, and also that it is not essential that the tertiary coils shall be in planes perpendicular to the planes of the primary and secondary coils.

Fig. 5 shows another modification wherein the conventional symbol designating a transformer is modified by the provision of lugs $n^2$ on which are wound tertiary coils T. This view illustrates in a simple form the essential characteristics of my transformer.

Figure 6:
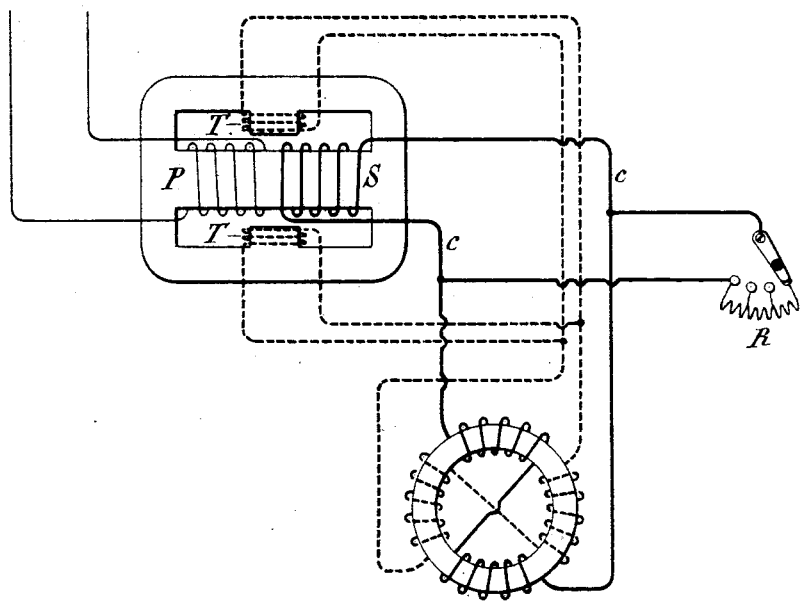

Fig. 6 illustrates an application of my invention which under some conditions may be desirable. The current in the secondary coil S is increased by introducing a resistance R, which may be constant or variable, in shunt or parallel with the secondary circuit $c$, thereby increasing the number of ampère turns in the coil S, and consequently increasing the strength of the consequent magnetic field, and increasing the electro-motive force in the tertiary circuit. By this means the phase-difference between the tertiary and secondary currents may be brought nearer to ninety degrees than would be possible under otherwise the same conditions. This arrangement will be particularly advantageous where it is desirable to obtain from the motor the maximum torque.

The essential principles of my invention may be applied in a variety of ways, it being only essential that relatively primary and secondary currents be applied so as to generate a consequent magnetic field, and the magnetic lines of this field be utilized to generate electro-motive force in a separate or tertiary circuit. Examples of possible modifications coming within the essential principles of my invention are given in Figs. 7 and 8.

Figure 7:
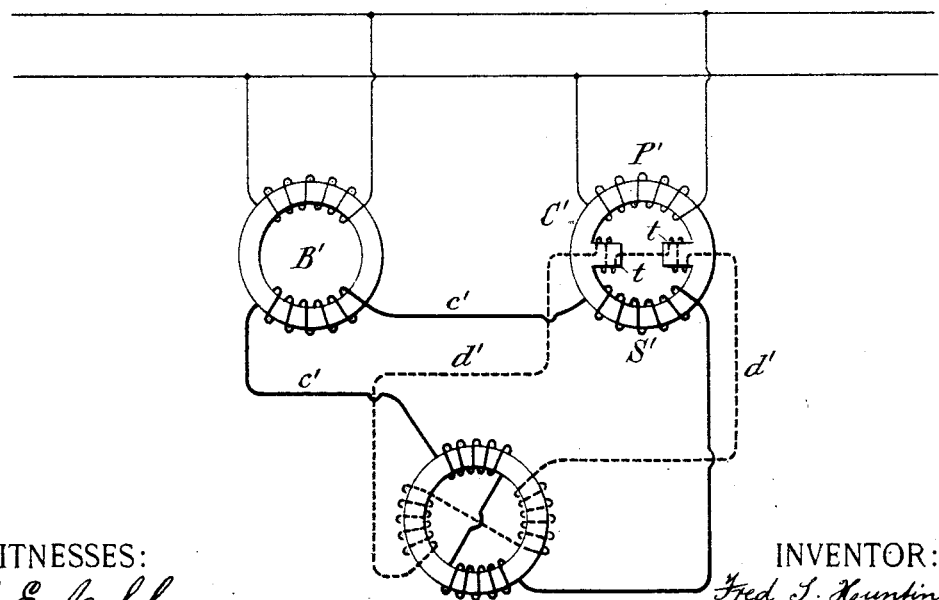

In Fig. 7, $B'$ designates diagrammatically a transformer of any ordinary type, the secondary coil of which is included in a secondary circuit $c'$, in which also are included the coils of the motor M. In this same secondary circuit is introduced serially the secondary coil $S'$ of the transformer $C'$. The primary coil $P'$ of this transformer is fed from the primary circuit either in series with the primary of the transformer $B'$, or in parallel, as shown. The tertiary coils, here lettered $t$ $t$, are connected in the tertiary circuit $d'$, and with the motor winding, in the same manner as already described.

Figure 8:
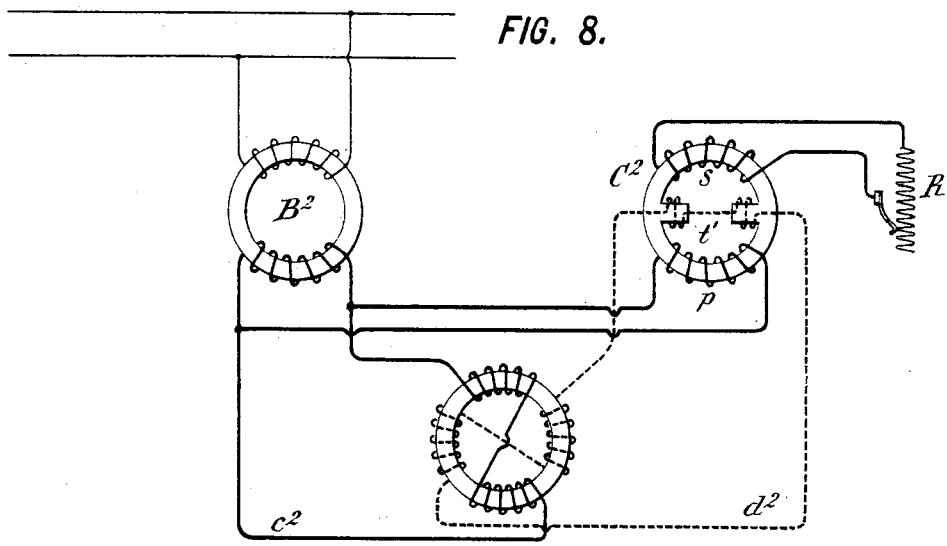

In the modification shown in Fig. 8, $B^2$ is a transformer of any ordinary construction, the secondary of which is connected in a secondary circuit $c^2$, which is connected in the same manner with the motor windings. A second transformer $C^2$ has its primary coil $p$ connected in parallel in the secondary circuit. Its secondary coil $s$ is connected in an independent circuit containing a resistance R, which may be fixed or variable. The tertiary coils $t'$ are connected in a tertiary circuit $d^2$, which is also connected with the motor winding in the same manner as previously described. In this construction the consequent magnetic field is generated by the opposing action of coils which are primary and secondary relatively to one another, the currents in the primary coil, however, being secondary currents in the sense that they are derived from the secondary circuit $c^2$, while the secondary coil $s$ being in an independent circuit, its current is free from the disturbing influences of the variations in the motor; and also by working on a resistance which may be non-inductive, the current may be freed entirely from lag. By this construction a greater phase difference may be secured in the currents on the circuits $c^2$ and $d^2$.

Figure 9:
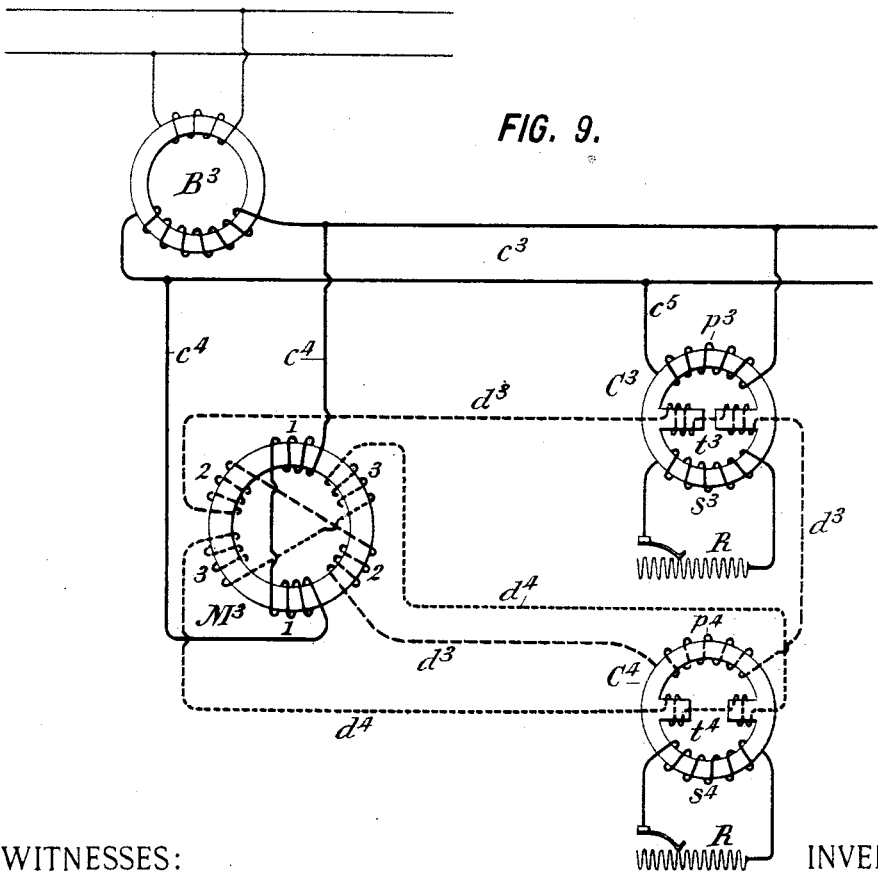

Fig. 9 shows a further modification or development of my invention by means of which tri-phased currents may be generated from single phase currents. By means of an ordinary step-down transformer $B^3$, the high tension currents on a primary circuit are transformed into low tension currents on a secondary circuit $c^3$. Relatively to the motor and other transformers, this circuit is a primary circuit, and I will therefore call it the local primary circuit. From this circuit a branch $c^4$ is taken, which includes the coils 1 1 of the motor $M^3$. Another branch $c^5$ is taken from the local primary circuit, in which is included the primary coil $p^3$ of a consequent pole transformer $C^3$. The secondary coil $s^3$ of this is in circuit with a resistance R or other suitable load. The tertiary coils $t^3$ of this transformer are included in the tertiary circuit $d^3$ which traverses the coils 2, 2, of the motor $M^3$. This tertiary circuit also traverses the primary coil $p^4$ of a second consequent pole transformer $C^4$. The secondary coil $s^4$ of this transformer also includes a dead resistance R or other suitable load. The tertiary coils $t^4$ of this transformer are included in a second tertiary circuit $d^4$ which traverses the coils 3, 3, of the motor $M^3$. Starting with the phase of the alternations on the local primary circuit $c^3$ and its branches as zero, I will assume that the parts are so proportioned as regards the amount of lag due to self-induction or other causes in the secondary coil $s^3$ and tertiary circuit $d^3$, that the phase of the current in this tertiary circuit has a lag of thirty degrees behind the theoretical phase difference of ninety degrees, thereby reducing it to a phase difference of sixty degrees from that on $c^3$. As this first tertiary current traverses the primary coil in the second transformer $C^4$, the current in the secondary coil $t^4$ should have theoretically a phase difference of ninety degrees therefrom, but I will assume that the proportions are such that it lags thirty degrees behind this theoretical, giving it thereby a phase difference of sixty degrees from $d^3$ or one hundred and twenty degrees from $c^3$. Hence the currents traversing the motor coils 1 and 3, have the required phase difference of one hundred and twenty degrees. By inverting the connections of the motor coils 2, the current phase is transposed or inverted, thereby giving it a phase difference of one hundred and twenty degrees from the currents in the coils 1 and 3 respectively. Thus the currents in the three coils have phases separated by one hundred and twenty degrees as required in a tri-phase motor.

Figure 10:
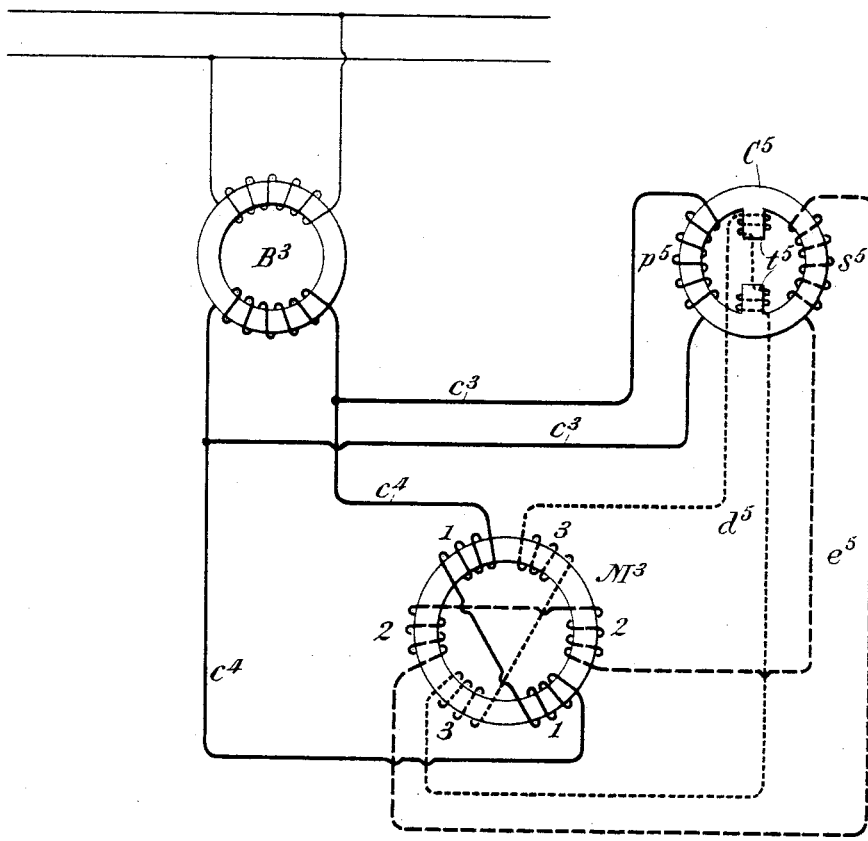

Fig. 10 shows a simpler arrangement for accomplishing the same result. Here a step-down transformer $B^3$ feeds a circuit $c^3$ as before, and this local primary circuit has a branch $c^4$ which includes the coils 1, 1, of the motor $M^3$ precisely as in Fig. 9. The circuit $c^3$ also is connected in like manner to the primary coil $p^5$ of a consequent-pole transformer $C^5$. The secondary coil $s^5$ thereof is connected in a secondary circuit $e^5$ in which are included the coils 2, 2, of the motor. The tertiary coils $t^5$ of this transformer are connected in a tertiary circuit $d^5$ which includes the coils 3, 3, of the motor. The proportions are such as to produce a lag of phase in the secondary current in circuit $e^5$, and again in the tertiary current in $d^5$, such as to approximate the results attained by Fig. 9, but with one less transformation, so that the phases of the currents in coils 1, 2 and 3 vary in succession by approximately sixty degrees, and hence by inverting the connections of the intermediate coil a phase-difference of approximately one hundred and twenty degrees is secured between the three coils.

My invention is not limited to the application of the currents of different phases for generating a revolving field in a motor, being equally applicable to generating such a field in a transformer, or wherever elsewhere such a revolving field may be desired.

I claim as my invention the following-defined novel features, substantially as hereinbefore specified, namely:

1. The improved mode of electric transmission of power, consisting in generating a single-phase alternating current, inducing therefrom a secondary current, generating a consequent magnetic field by subjecting an iron core to the opposed magnetization of relatively primary and secondary coils, inducing from said consequent field a tertiary current of phase different from said secondary current, and applying said secondary and tertiary currents to generate a rotary field.

2. The improved mode of electric transmission of power, consisting in generating a single-phase alternating current, inducing therefrom a secondary current, generating a consequent magnetic field by subjecting an iron core to the opposed magnetization of said primary and secondary currents, inducing from said consequent field a tertiary current of phase different from said secondary current, and applying said secondary and tertiary currents to generate a rotary field.

3. A transformer for electric power transmission consisting of a core, primary and secondary coils wound thereon in positions to generate between them a consequent magnetic field, and a tertiary coil wound to inclose the lines of said consequent field, whereby there is generated in it an alternating electro motive force differing in phase from the secondary current and said tertiary coil having terminals for connecting a consumption circuit.

4. A transformer for electric power transmission consisting of a core formed with two slots, primary and secondary coils wound therein at opposite ends thereof to generate between them a consequent magnetic field, and tertiary coils wound in said slots to inclose the lines of said consequent field and having terminals for connecting a consumption circuit.

5. A transformer for electric power transmission consisting of a core, primary and secondary coils wound thereon in positions to generate between them a consequent magnetic field, the core formed with lugs in said consequent field, and tertiary coils wound on said lugs to inclose the lines of said consequent field and having terminals for connecting a consumption circuit.

6. The combination of a relatively primary and secondary circuit, a transformer having its core wound with a primary coil in said primary circuit, and a secondary coil in said secondary circuit, said coils wound in positions to generate a consequent magnetic field, a tertiary coil wound to inclose the lines of said consequent field, a tertiary circuit fed from said tertiary coil, and a motor having its field coils connected in said secondary and tertiary circuits.

In witness whereof I have hereunto signed my name in the presence of two subscribing witnesses.

FRED S. HUNTING.

Witnesses:
G. T. WOODWARD,
H. D. HARING.